United States Patent
Xu

(10) Patent No.: US 9,031,675 B2
(45) Date of Patent: May 12, 2015

(54) FUZZY CONTROL METHOD AND APPARATUS FOR SIGNAL RECEIVING PART IN HIGH SPEED WAVELENGTH DIVISION MULTIPLEXING SYSTEM

(75) Inventor: Hao Xu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 496 days.

(21) Appl. No.: 13/389,330

(22) PCT Filed: Dec. 8, 2009

(86) PCT No.: PCT/CN2009/075390
§ 371 (c)(1),
(2), (4) Date: Feb. 7, 2012

(87) PCT Pub. No.: WO2011/022899
PCT Pub. Date: Mar. 3, 2011

(65) Prior Publication Data
US 2012/0141120 A1    Jun. 7, 2012

(30) Foreign Application Priority Data

Aug. 26, 2009    (CN) .......................... 2009 1 0169361

(51) Int. Cl.
*G05B 13/02* (2006.01)
*H04B 17/00* (2006.01)
(Continued)

(52) U.S. Cl.
CPC ........... *H04Q 11/0062* (2013.01); *H04B 10/07* (2013.01); *H04J 14/02* (2013.01);
(Continued)

(58) Field of Classification Search
CPC ..................................................... G06N 7/02

USPC ............................................................ 700/50
See application file for complete search history.

(56) References Cited

U.S. PATENT DOCUMENTS 7,133,611 B2 * 11/2006 Kaneko .......................... 398/30
2003/0016695 A1    1/2003 Sabet et al.
(Continued)

FOREIGN PATENT DOCUMENTS

CN    1444349 A    9/2003
CN    1581735 A    2/2005

OTHER PUBLICATIONS

Watson "Case-based Reasoning is a Methodology not a Technology" from "Knowledge-Based System 12 (1999) 303-308".*
International Search Report for PCT/CN2009/075390 dated May 19, 2010.

*Primary Examiner* — Mohammad Ali
*Assistant Examiner* — Yuhui R Pan
(74) *Attorney, Agent, or Firm* — Ling and Yang Intellectual Property LLC

(57) ABSTRACT

A fuzzy control method and apparatus for a signal receiving part in a high speed WDM system are provided, wherein, the method comprises the following steps: step A, obtaining related information of each device in a receiving system and working environment parameter information of the receiving system; step B, according to the related information of each device and the working environment parameter information, finding out fuzzy control parameters which best match the related information of each device and the working environment parameter information from a fuzzy control parameter table stored in the system, and controlling the parameters of each device in the receiving system according to the fuzzy control parameters to make the system reach the best receiving balancing point. The method and apparatus can simplify the adjusting steps of the receiver and save the adjusting time.

12 Claims, 2 Drawing Sheets

(51) Int. Cl.
*H04Q 11/00* (2006.01)
*H04B 10/07* (2013.01)
*H04J 14/02* (2006.01)

(52) U.S. Cl.
CPC ........ *H04J 14/0227* (2013.01); *H04J 14/0256* (2013.01); *H04J 14/0258* (2013.01); *H04J 14/0267* (2013.01); *H04Q 2011/0084* (2013.01); *H04J 14/0269* (2013.01)

(56) References Cited

U.S. PATENT DOCUMENTS

| | | | |
|---|---|---|---|
| 2007/0053699 A1* | 3/2007 | Ichino | 398/208 |
| 2008/0069571 A1 | 3/2008 | Honda | |
| 2008/0249817 A1* | 10/2008 | Nauck et al. | 705/7 |
| 2009/0196624 A1* | 8/2009 | Zhang | 398/135 |

* cited by examiner

FUZZY CONTROL METHOD AND APPARATUS FOR SIGNAL RECEIVING PART IN HIGH SPEED WAVELENGTH DIVISION MULTIPLEXING SYSTEM

TECHNICAL FIELD

The present invention relates to the field of optical communication technology, and in particular, to a fuzzy control method and apparatus for signal receiving part in high speed Wavelength Division Multiplexing (WDM) system.

BACKGROUND OF THE RELATED ART

With the evolving and developing of the conventional Dense Wavelength Division Multiplexing (DWDM) optical transmission system, the transmission with higher speed (≥40 Gbit/s) implemented in a single channel has become a clearer direction for the evolution thereof. In the evolution direction, an important technology is the high speed optical signal processing at the receiving end of the channel, i.e. how to transform efficiently the high speed optical signal into the information which is recognizable by the receiving chip. Wherein, the following technologies may be involved:

1. since the dispersion tolerance of the high speed transmission system is exponentially reduced, more accurate channel dispersion compensation technology is needed, i.e. accurate dispersion complementation technology.
2. since the front end of the receiver needs to be adjusted to a suitable power level as needed by the receiving module, the power control technology is needed.
3. since the receiving level of the receiver needs to be adjusted according to the received signal to ensure the error correction error ratio to be roughly identical, the receiving level control technology needs to be used.
4. a demodulation technology related closely to code type needs to be used, for example, for the DPSK code type, there is the Delay Interferometer (DLI) control technology.
5. a phase modulation technology for the received signals needs to be used to achieve optimal Clock and Data Recovery (CDR) effect by adjusting the phase of receiver.

In conclusion, many conditions may influence the final data receiving result at the receiving end processing the high speed optical signals, and the restraining and balancing factors between various conditions are very complicated, thus an accurate result may be difficult to obtain by the way of simulation. Presently, in practical applications, the trial and error procedure is mainly used, that is, the receiving characteristics are observed in various conditions by configuring different parameters for various factors, until the suitable receiving balancing point is found.

However, the method has the following disadvantages: the combination trial and error algorithm is so complicated that it takes a long time to reach the optimal receiving area of the system, and sometimes the process of parameter adjustment will cause the case that the receiving characteristics differ greatly and the performances are frequently repeated. When the receiver is changed by another with different type, the whole system must search for a new optimal receiving balancing point again.

SUMMARY OF THE INVENTION

The purpose of the invention is to provide a fuzzy control method for signal receiving part in a high speed wavelength division multiplexing (WDM) system, which can simplify the adjusting steps of receivers and save the adjusting time.

Another purpose of the invention is to provide a fuzzy control apparatus for signal receiving part in a high speed wavelength division multiplexing system, which can simplify the adjusting steps of receivers and save the adjusting time.

The fuzzy control method for signal receiving part in a high speed wavelength division multiplexing system disclosed in the invention comprises the following steps:

A. obtaining related information of each device in a receiving system and working environment parameter information of the receiving system;

B. according to the related information of each device and the working environment parameter information, finding fuzzy control parameters which best match the related information of each device and the working environment parameter information from a fuzzy control parameter table stored in the system, and controlling the parameters of each device in the system according to the found fuzzy control parameters.

The step B specifically comprises:

B1. searching the fuzzy control parameter table to check whether the fuzzy control parameter table comprises the fuzzy control parameters which best match the related information of each device and the working environment parameter information, if yes, issuing one group of the control parameters from the fuzzy control parameters matching condition to each device and performing step B2; or else, performing step B3;

B2. judging whether quality of signals received by the system is acceptable, if yes, storing the configured fuzzy control parameters corresponding to the parameters of each device and environment information, ending the flow; or else, selecting another group of parameters from the fuzzy control parameters matching the condition and issuing to each device and returning to step B2 to judge continuously, and performing step B3 when the quality of signals received by the system is unacceptable after each group of control parameters of all the fuzzy control parameters matching the condition have been issued to each device;

B3. using trial and error algorithm to configure different parameters and judging whether the quality of signals received by the system is acceptable, if yes, storing presently configured fuzzy control parameters corresponding to the parameters of each device and environment information; or else, ending flow.

In the step B2, storing the configured fuzzy control parameters corresponding to the parameters of each device and environment information when the quality of signals received by the system is acceptable is specifically:

when the quality of signals received by the system is acceptable, finely tuning each device, and judging whether the quality of signals received by the system is improved, if the quality of signals received by the system is improved, storing the configured fuzzy control parameters corresponding to the parameters of each device and environment information; or else, continuing to finely tune each device again.

In the step B3, storing the configured fuzzy control parameters corresponding to the parameters of each device and environment information when the quality of signals received by the system is acceptable after using trial and error algorithm to configure different parameters is specifically:

when the quality of signals received by the system is acceptable, finely tuning each device and judging whether the quality of signals received by the system is improved, if the quality of signals received by the system is improved, storing the configured fuzzy control parameters corresponding to the parameters of each device and environment information; or else, continuing to finely tune each device.

The working environment parameter information of the receiving system comprises one or more kinds of parameter information, such as optical fiber span range, wavelength information, receiving optical power magnitude, dispersion pre-complication information and optical fiber type information.

The fuzzy control parameter table stored in the system is a key value corresponding table, wherein, the constitution of the key is the information of each device and the working environment parameter information;

the key value corresponding table is set according to proportion of effect of each device and the working environment parameter on configuration result, and can be compressed, extended or change the constitution of the key according to practical situation.

The invention further provides a fuzzy control apparatus for signal receiving part in a high speed wavelength division multiplexing system, comprising a receiving device unit, a receiving device information storage unit, a receiving environment information storage unit and a receiving system control unit, wherein, the receiving device information storage unit is used to store related information of each device in the receiving device unit;

the receiving environment information storage unit is used to store working environment parameters of present receiving system;

the receiving system control unit is used to, according to the related information stored in the receiving device information storage unit and the receiving environment information storage unit, find fuzzy control parameters which best match the related information of each device and the working environment parameter information from a fuzzy control parameter table stored in the system, and control the parameters of each device in the receiving system according to the fuzzy control parameters.

The receiving system control unit is further used to issue one group of control parameters in the fuzzy control parameters matching the condition to each device, and store configured fuzzy control parameters corresponding to parameters of each device and environment information when quality of signals received by the system is acceptable; when the quality of signals received by the system is unacceptable, select another group of parameters from the fuzzy control parameters matching the condition in sequence to issue to each device till the quality of signals received by the system is acceptable; when the quality of signals received by the system is unacceptable after each group of control parameters of all the fuzzy control parameters matching the condition have been issued to each device, use trial and error algorithm to configure different parameters till the quality of signals received by the system is acceptable, and end the operation if still unacceptable.

The receiving system control unit is further used to, when the quality of signals received by the system is acceptable, finely tune each device, and store the configured fuzzy control parameters corresponding to the parameters of each device and environment information if the quality of signals received by the system is improved, if not, continue to finely tune each device.

The receiving system control unit is further used to, after using the trial and error algorithm to configure different parameters, when the quality of signals received by the system is acceptable, finely tune each device and store the configured fuzzy control parameters corresponding to the parameters of each device and environment information if the quality of signals received by the system is improved, if not, continue to finely tune each device to achieve optimal signal receiving quality.

The fuzzy control method and apparatus for signal receiving part in a high speed WDM system of the invention achieve the effect of saving adjusting time and simplify the adjusting algorithm of the receiver under common situation since the technical measure of presetting parameters of receiver of the whole system with the fuzzy parameter control table is used, meanwhile, the frequent jitter of the performance in the early system is avoided since the adjusting steps are cut down.

PREFERRED EMBODIMENTS OF THE PRESENT INVENTION

The fuzzy control method and apparatus for signal receiving part in high speed WDM system of the invention are described in detail below with reference to drawings.

Figure 1:
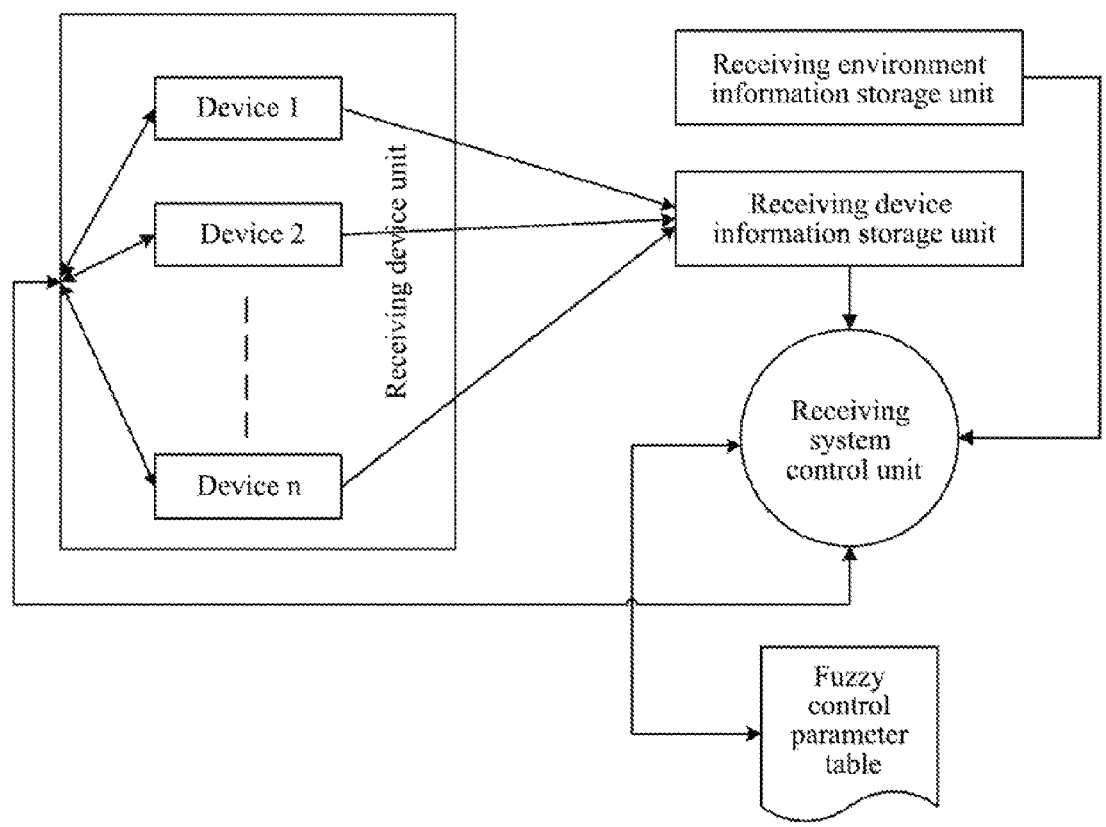
FIG. 1 is the schematic diagram of the connection relationship inside the fuzzy control apparatus for signal receiving part in high speed WDM system of the invention.

FIG. 1 is the schematic diagram of the connection relationship inside the fuzzy control apparatus for signal receiving part in high speed WDM system of the invention. As shown in FIG. 1, the fuzzy control apparatus for signal receiving part in high speed WDM system of the invention comprises a receiving device unit, a receiving device information storage unit, a receiving environment information storage unit and a receiving system control unit.

Wherein, the receiving device unit is the set of all devices operable in the receiving system. For example, the receiving device unit comprises a dispersion adjusting device, a power adjusting device, a phase adjusting device, a receiving level adjusting device and so on.

The receiving device information storage unit is used to store related information of each device in the receiving device unit; wherein, the related information comprises model, manufacturer, type, and so on.

The receiving environment information storage unit is used to store working environment parameters of present receiving system; wherein, the working environment parameters comprise front part optical fiber span range, wavelength information, receiving optical power magnitude and so on.

The receiving system control unit is used to, according to the related information stored in the receiving device information storage unit and the receiving environment information storage unit, find fuzzy control parameters which best match the above related information from a fuzzy control parameter table stored in the system, and control the parameters of each device in the receiving system according to fuzzy control parameters.

The receiving system control unit is further used to issue one group of control parameters in the fuzzy control parameters matching basic receiving condition of the system to each device, and store configured fuzzy control parameters corresponding to parameters of each device parameters and environment information, when quality of signals received by the system is acceptable; when the quality of signals received by the system is unacceptable, select another group of parameters of the fuzzy control parameters matching the condition in sequence and issue to each device till the quality of signals received by the system is acceptable; when the quality of signals received by the system is unacceptable for all groups of control parameters of the fuzzy control parameters matching condition, use trial and error algorithm to configure different parameters till the quality of signals received by the system is acceptable, and end the operation if still unacceptable.

The receiving system control unit is further used to, when the quality of signals received by the system is acceptable, finely tune each device, and store the configured fuzzy control parameters corresponding to the parameters of each device and environment information if the quality of signals received by the system is improved, if not, continue to finely tune each device to achieve optimal signal receiving quality.

The receiving system control unit is further used to, after using the trial and error algorithm to configure different parameters, when the quality of signals received by the system is acceptable, finely tune each device and store the configured fuzzy control parameters corresponding to the parameters of each device and environment information if the quality of signals received by the system is improved, if not, continue to finely tune each device to achieve optimal signal receiving quality.

Figure 2:
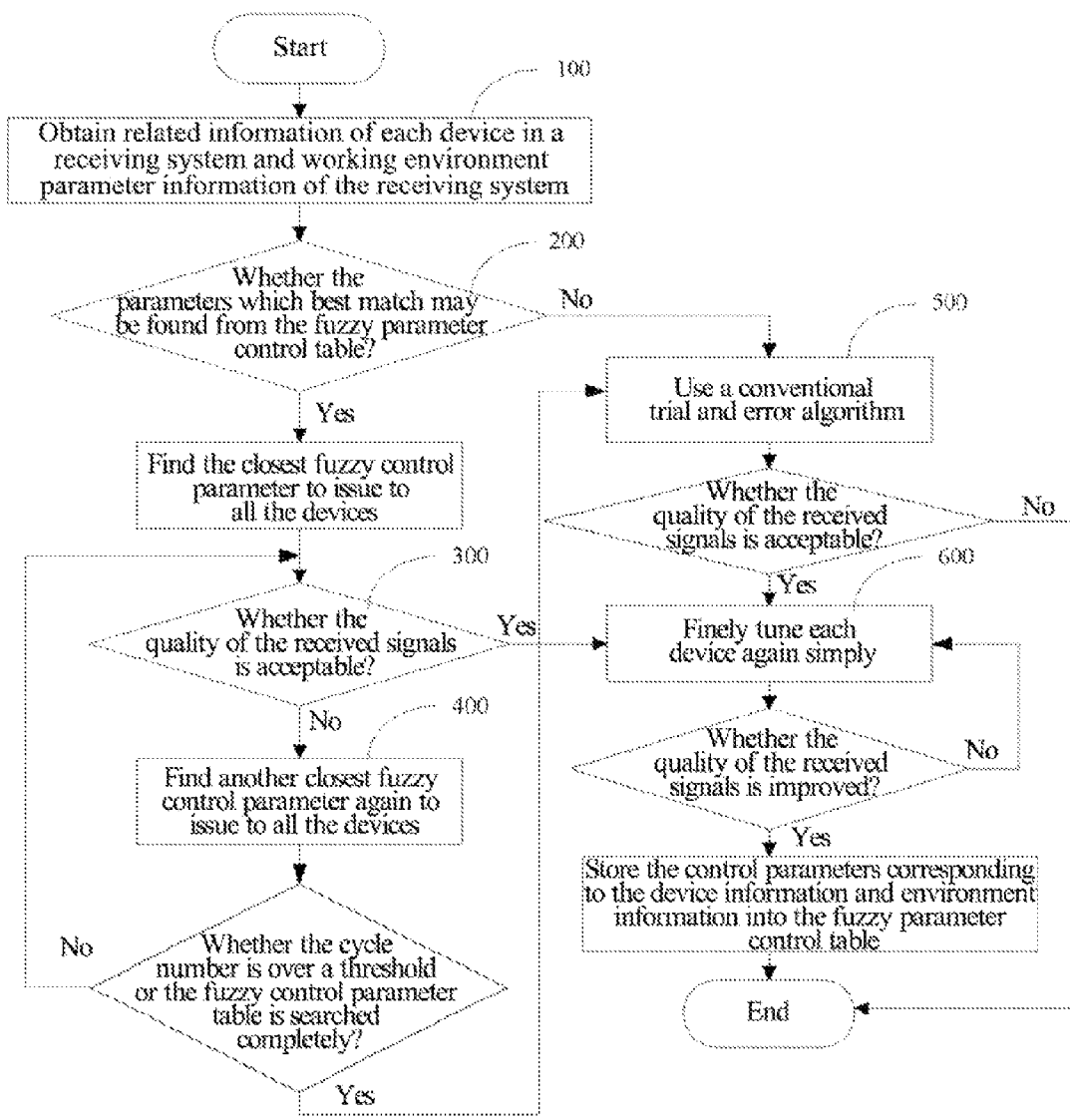
FIG. 2 is the schematic flowchart of the fuzzy control method for signal receiving part in high speed WDM system of the invention.

FIG. 2 is the schematic flowchart of the fuzzy control method for signal receiving part in high speed WDM system of the present invention. As shown in FIG. 2, the inventive fuzzy control method for signal receiving part in high speed WDM system comprises the following steps:

step 100, obtaining related information of each device in a receiving system and working environment parameter information of the receiving system;

step 200, searching the fuzzy control parameter table stored in the system to check whether the fuzzy control parameter table comprises fuzzy control parameters which best match the obtained related information of each device and working environment parameter information of the receiving system, if yes, finding the fuzzy control parameter which is closest to the parameter value to issue to all the devices, and then performing step 300; or else, performing step 500;

step 300, judging whether quality of signals received by the system is acceptable, if yes, performing step 600; or else, performing step 400;

step 400, selecting again another fuzzy control parameter which best matches from the remained fuzzy control parameters in the previous step to configure, returning to step 300 when the cycle number is not over a threshold or the fuzzy control parameter table is not searched completely; performing step 500 when the cycle number is over the threshold or the fuzzy control parameter table is completely searched;

step 500, using a trial and error algorithm to configure each factor with different parameters and judging whether the quality of signals received by the system is acceptable, if yes, performing step 600; or else, the flow ending;

step 600, finely tuning each device to achieve optimal quality of the received signals, and storing the fuzzy control parameters corresponding to the present related information of each device and working environment parameter information of the receiving system into the fuzzy control parameter table.

Specifically, it is assumed that for a certain high speed receiving system, the receiving devices thereof have the following four (just for example, which may be extended or combined based on practical condition): a dispersion compensation device, an optical power control device, a receiving level control device and a receiving phase control device.

Meanwhile it is assumed that the receiving environment influencing factors have the following four (just for example, which may be extended or combined based on practical condition): wavelength information, dispersion pre-compensation information, optical fiber type information and optical fiber span information.

Based on the above information, a fuzzy control parameter table is made, which may be viewed as a key value corresponding table. The constitution of the key is the information of each device and the working environment parameter; the key value corresponding table is configured according to the proportion of effect of each device and the working environment parameter on the configuring result. For example, simply, a definition of 32 bit-key may be configured as shown in table 1.

TABLE 1

| 31~28 | 27~24 | 23~20 | 19~16 | 15~12 | 11~8 | 7~4 | 3~0 |
|---|---|---|---|---|---|---|---|
| Dispersion compensation device | Power control device | Level control device | Phase control device | Dispersion pre-compensation information | Optical fiber type information | Optical fiber span information | Channel wavelength information |

Thus, the number of types which may be practically represented by each kind of information is $2^4=16$, which may be compressed, extended or change the constitution of the keys according to practical condition.

The corresponding value is the configuring parameter of each device when the optimal receiving quality is obtained under that key. Simply, the definition of 32 bit-key may be configured as shown in table 2.

TABLE 2

| 31~24 | 23~16 | 15~8 | 7~0 |
|---|---|---|---|
| Configured value of dispersion compensation device | Configured value of power control device | Configured value of level control device | Configured value of phase control device |

Thus, the configured values which may be practically represented by each kind of information is $2^8=256$, which may be compressed, extended or change the constitution of values according to practical condition.

The processing of the received signals according to the steps shown in FIG. 2 is described below in detail:

Example 1

The fuzzy control method for a signal receiving part in a high speed WDM system in the example comprises the following steps.

Step 11, the present device information and environment information are read to constitute the present key values as follows:

| Dispersion compensation device | Power control device | Level control device | Phase control device | Dispersion pre-compensation information | Optical fiber type information | Optical fiber span information | Channel wavelength information |
|---|---|---|---|---|---|---|---|
| 0x0001 | 0x0001 | 0x0001 | 0x0001 | 0x0016 | 0x0005 | 0x0002 | 0x0004 |

Step 12, the key values which can be found in the fuzzy parameter control table are as follows: Step 12, the key values which can be found in the fuzzy parameter control table are as follows:

| Dispersion compensation device | Power control device | Level control device | Phase control device | Dispersion pre-compensation information | Optical fiber type information | Optical fiber span information | Channel wavelength information |
|---|---|---|---|---|---|---|---|
| 0x0002 | 0x0001 | 0x0007 | 0x0005 | 0x0020 | 0x0005 | 0x0003 | 0x0005 |
| 0x0002 | 0x0001 | 0x0001 | 0x0001 | 0x0005 | 0x0004 | 0x0002 | 0x0006 |
| 0x0001 | 0x0001 | 0x0001 | 0x0001 | 0x0016 | 0x0005 | 0x0002 | 0x0007 |
| 0x0001 | 0x0003 | 0x0003 | 0x0001 | 0x0014 | 0x0004 | 0x0002 | 0x0008 |

It can be seen that the third group of keys are closest to the present key, only with the difference of wavelength (0x0004–0x0007), and the group of parameter key is selected as the fuzzy parameters closest to the practical condition according to the algorithm.

Step 13, the information of the values corresponding to the parameter key is checked as follows:

| Configured value of dispersion compensation device | Configured value of power control device | Configured value of level control device | Configured value of phase control device |
|---|---|---|---|
| 0x000001F4 | 0x00000063 | 0x00000032 | 0x0000000A |

The values correspond respectively to different configured values for the four devices. The value is decomposed and issued to each device.

Step 14, it is to check whether the receiving quality of the present receiver meets the requirement. For example, it is to check whether the presently instant error code ratio is lower than $1\times10^{-6}$. If the receiving quality does not meet the requirement, it is to search the fuzzy control parameter table to check whether there are still other key values close to the present key value. There is no in the example, and then the conventional method is directly tried. If the requirement is met, it is to proceed to the followings.

Step 15, each device is finely tuned in sequence. The method for finely tuning is: trying an offset with the smallest set unit in both left and right directions of the original configured values, if the receiving quality is not improved, then stopping; if there is an improvement, continuing in that direction till there is no improvement. When one device configuration value is changed, the other three device configuration values are not changed.

Step 16, when the finely tuning is over, the values corresponding to present parameter key is as follows.

| Configured value of dispersion compensation device | Configured value of power control device | Configured value of level control device | Configured value of phase control device |
|---|---|---|---|
| 0x00000202 | 0x00000060 | 0x00000036 | 0x0000000A |

The values are taken as the new values of the key as follows and stored into the simulation control parameter table:

| Dispersion compensation device | Power control device | Level control device | Phase control device | Dispersion pre-compensation information | Optical fiber type information | Optical fiber span information | Channel wavelength information |
|---|---|---|---|---|---|---|---|
| 0x0001 | 0x0001 | 0x0001 | 0x0001 | 0x0016 | 0x0005 | 0x0002 | 0x0004 |

Example 2

The fuzzy control method for a signal receiving part in a high speed WDM system in the example comprises the following steps.

Step 21, present device information and environment information are read to constitute present key values as follows:

| Dispersion compensation device | Power control device | Level control device | Phase control device | Dispersion pre-compensation information | Optical fiber type information | Optical fiber span information | Channel wavelength information |
|---|---|---|---|---|---|---|---|
| 0x0002 | 0x0003 | 0x0003 | 0x0002 | 0x000A | 0x0004 | 0x0001 | 0x0004 |

Step 22, the key values which can be found in the current fuzzy parameter control table are as follows:

| Dispersion compensation device | Power control device | Level control device | Phase control device | Dispersion pre-compensation information | Optical fiber type information | Optical fiber span information | Channel wavelength information |
|---|---|---|---|---|---|---|---|
| 0x0002 | 0x0001 | 0x0007 | 0x0005 | 0x0020 | 0x0005 | 0x0003 | 0x0005 |
| 0x0002 | 0x0001 | 0x0001 | 0x0001 | 0x0005 | 0x0004 | 0x0002 | 0x0006 |
| 0x0001 | 0x0001 | 0x0001 | 0x0001 | 0x0016 | 0x0005 | 0x0002 | 0x0007 |
| 0x0001 | 0x0003 | 0x0003 | 0x0001 | 0x0014 | 0x0004 | 0x0002 | 0x0008 |

Since the present key values differ greatly from the key values in the table, the existing key values can not be used.

Step 23, the conventional trying way is used again to gradually find the optimal receiving point.

Step 24, the present device parameter values are transformed into simulation control parameters and stored into the control unit by the way corresponding to the key values.

In conclusion, based on the fuzzy control method and apparatus for a signal receiving part in a high speed WDM system of the invention, the technical measure of presetting parameters of whole receiver of the system with the fuzzy parameter control table is used, so the effect of saving adjusting time is achieved, and the adjusting algorithm of the receiver under usual situation is simplified, meanwhile, since the adjusting steps are cut down practically, the frequent jitter of performance in the early system is avoided.

The above is the detailed description of the invention for those skilled in the art to understand the invention, but it may be conceived that other variations and modifications may be made without departing from the scope covered by the claims of the invention, and these variations and modifications are both in the protection scope of the invention.

What is claimed is:

1. A fuzzy control method for a signal receiving part in a high speed wavelength division multiplexing system, comprising following steps:
   A. obtaining related information of each device in a receiving system and working environment parameter information of the receiving system;
   B. according to the related information of each device and the working environment parameter information, finding out fuzzy control parameters which best match the related information of each device and the working environment parameter information from a fuzzy control parameter table stored in the system, and controlling the parameters of each device in the receiving system according to the found fuzzy control parameters;

wherein, the step B specifically comprises:
   B1. searching the fuzzy control parameter table to check whether the fuzzy control parameter table comprises the fuzzy control parameters which best match the related information of each device and the working environment parameter information, if yes, issuing one group of the control parameters in the fuzzy control parameters matching condition to each device and performing step B2; or else, performing step B3;
   B2. judging whether quality of signals received by the system is acceptable, if yes, storing the fuzzy control parameters corresponding to configured parameters of each device and environment information, ending flow; or else, selecting another group of parameters of the fuzzy control parameters matching condition to issue to each device and returning to step B2 to judge continuously, and performing step B3 when the quality of the signals received by the system is still unacceptable after all groups of control parameters of the fuzzy control parameters matching condition have been issued to each device;

B3. using a trial and error algorithm to configure different parameters and judging whether the quality of the signals received by the system is acceptable, if yes, storing the fuzzy control parameters corresponding to the currently configured parameters of each device and the environment information; or else, ending flow.

2. The method according to claim 1, wherein, storing the fuzzy control parameters corresponding to the configured parameters of each device and the environment information when the quality of the signals received by the system is acceptable in step B2 specifically comprises:
when the quality of the signals received by the system is acceptable, finely tuning each device, and judging whether the quality of the signals received by the system is improved, if the quality of the signals received by the system is improved, storing the fuzzy control parameters corresponding to the configured parameters of each device and the environment information; or else, continuing to finely tune each device again.

3. The method according to claim 1, wherein, storing the fuzzy control parameters corresponding to the configured parameters of each device and the environment information when the quality of the signals received by the system is acceptable after using the trial and error algorithm to configure different parameters in step B3 specifically comprises:
when the quality of the signals received by the system is acceptable, finely tuning each device and judging whether the quality of the signals received by the system is improved, if the quality of the signals received by the system is improved, storing the fuzzy control parameters corresponding to the configured parameters of each device and the environment information; or else, continuing to finely tune each device.

4. The method according to claim 1, wherein, the working environment parameter information of the receiving system comprises one or more kinds of following parameter information: optical fiber span range, wavelength information, receiving optical power magnitude, dispersion pre-compensation information and optical fiber type information.

5. The method according to claim 1, wherein, the fuzzy control parameter table stored in the system is a key value corresponding table, wherein,
the key consists of the information of each device and the working environment parameter information;
the key value corresponding table is configured according to a proportion of an effect of the information of each device and the working environment parameter information on a configuring result, and is compressed, extended or changes a constitution of the key according to practical situations.

6. A fuzzy control apparatus for a signal receiving part in a high speed wavelength division multiplexing system, comprising a receiving device unit, a receiving device information storage unit, a receiving environment information storage unit and a receiving system control unit, wherein,
the receiving device information storage unit is used to store related information of each device in the receiving device unit;
the receiving environment information storage unit is used to store working environment parameters of the receiving system;
the receiving system control unit is used to, according to the related information stored in the receiving device information storage unit and the receiving environment information storage unit, find out fuzzy control parameters which best match the related information of each device and the working environment parameter information from a fuzzy control parameter table stored in the system, and control parameters of each device in the receiving system according to the fuzzy control parameters;
wherein, the receiving system control unit is further used to issue one group of control parameters in the fuzzy control parameters matching a basic receiving condition of the system to each device, and store the fuzzy control parameters corresponding to configured parameters of each device and environment information when quality of signals received by the system is acceptable; when the quality of the signals received by the system is unacceptable, select in sequence another group of parameters of the fuzzy control parameters matching the condition to issue to each device till the quality of the signals received by the system is acceptable; when the quality of the signals received by the system is unacceptable after all groups of control parameters of the fuzzy control parameters matching the condition have been issued to each device, use a trial and error algorithm to configure different parameters till the quality of the signals received by the system is acceptable, and end operation if still unacceptable.

7. The apparatus according to claim 6, wherein,
the receiving system control unit is further used to, when the quality of the signals received by the system is acceptable, finely tune each device, and store the fuzzy control parameters corresponding to the configured parameters of each device and the environment information if the quality of the signals received by the system is improved, and if the quality of the signals received by the system is not improved, continue to finely tune each device.

8. The apparatus according to claim 6, wherein,
the receiving system control unit is further used to, after using the trial and error algorithm to configure different parameters, when the quality of the signals received by the system is acceptable, finely tune each device and store the fuzzy control parameters corresponding to the configured parameters of each device and the environment information if the quality of signals received by the system is improved, and if the quality of the signals received by the system is not improved, continue to finely tune each device to achieve optimal quality of the received signals.

9. The method according to claim 2, wherein, the working environment parameter information of the receiving system comprises one or more kinds of following parameter information: optical fiber span range, wavelength information, receiving optical power magnitude, dispersion pre-compensation information and optical fiber type information.

10. The method according to claim 3, wherein, the working environment parameter information of the receiving system comprises one or more kinds of following parameter information: optical fiber span range, wavelength information, receiving optical power magnitude, dispersion pre-compensation information and optical fiber type information.

11. The method according to claim 2, wherein, the fuzzy control parameter table stored in the system is a key value corresponding table, wherein,
the key consists of the information of each device and the working environment parameter information;
the key value corresponding table is configured according to a proportion of an effect of the information of each device and the working environment parameter information on a configuring result, and is compressed, extended or changes a constitution of the key according to practical situations.

12. The method according to claim 3, wherein, the fuzzy control parameter table stored in the system is a key value corresponding table, wherein, the key consists of the information of each device and the working environment parameter information;

the key value corresponding table is configured according to a proportion of an effect of the information of each device and the working environment parameter information on a configuring result, and is compressed, extended or changes a constitution of the key according to practical situations.

* * * * *